United States Patent
Oosawa

(10) Patent No.: US 7,813,576 B2
(45) Date of Patent: Oct. 12, 2010

(54) IMAGE PROCESSING APPARATUS

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1929 days.

(21) Appl. No.: 10/718,694

(22) Filed: Nov. 24, 2003

(65) Prior Publication Data

US 2004/0101188 A1 May 27, 2004

(30) Foreign Application Priority Data

Nov. 27, 2002 (JP) ............................. 2002-343853
Dec. 2, 2002 (JP) ............................. 2002-349806

(51) Int. Cl.
*G06K 9/40* (2006.01)

(52) U.S. Cl. ...................... 382/254; 382/181; 382/309; 382/310

(58) Field of Classification Search ................. 382/254, 382/132, 309, 310, 218, 181, 236; 250/584
See application file for complete search history.

(56) References Cited

U.S. PATENT DOCUMENTS

| | | | | |
|---|---|---|---|---|
| 5,631,974 A * | 5/1997 | Lau-Kee et al. | ............. | 382/132 |
| 5,644,650 A * | 7/1997 | Suzuki et al. | ............. | 382/132 |
| 5,680,471 A * | 10/1997 | Kanebako et al. | ........... | 382/128 |
| 5,696,848 A * | 12/1997 | Patti et al. | .................... | 382/254 |
| 5,796,874 A * | 8/1998 | Woolfe et al. | ............... | 382/254 |
| 5,799,111 A * | 8/1998 | Guissin | ....................... | 382/254 |
| 5,841,148 A * | 11/1998 | Some et al. | .................. | 250/584 |
| 5,909,602 A * | 6/1999 | Nakai et al. | ..................... | 399/8 |
| 5,911,008 A * | 6/1999 | Niikura et al. | ............. | 382/236 |
| 5,956,416 A * | 9/1999 | Tsuruoka et al. | ............ | 382/128 |
| 6,173,082 B1 * | 1/2001 | Ishida et al. | ................. | 382/254 |
| 6,198,770 B1 * | 3/2001 | Kondo | .................. | 375/240.14 |
| 6,317,510 B1 * | 11/2001 | Murakami | .................. | 382/132 |
| 6,356,651 B2 * | 3/2002 | Murakami | .................. | 382/128 |
| 6,411,741 B1 * | 6/2002 | Hamamura et al. | ......... | 382/254 |
| 6,415,049 B1 * | 7/2002 | Yanagita et al. | ............. | 382/132 |
| 6,654,504 B2 * | 11/2003 | Lubin et al. | ................. | 382/254 |
| 6,671,417 B1 * | 12/2003 | Koshinaka | .................. | 382/254 |
| 6,911,988 B1 * | 6/2005 | Tsujii | ......................... | 345/581 |

(Continued)

FOREIGN PATENT DOCUMENTS

JP           8-335721 A       12/1996

OTHER PUBLICATIONS

A. Kano, et al., "Digital Image Subtraction of Temporally Sequential Chest Images for Detection of Interval Change", Med. Phys. 21(3), Mar. 1994, 453-461[1].

*Primary Examiner*—Daniel G Mariam
*Assistant Examiner*—Aklilu k Woldemariam
(74) *Attorney, Agent, or Firm*—Sughrue Mion, PLLC

(57) ABSTRACT

A difference image is obtained between two images which are objects of comparative viewing, regardless of whether the images are processed images. A judgment means judges whether the two images are processed images, based on process confirmation data attached thereto. A correction means corrects images which have been judged to be processed images by the judgment means to a state equivalent to that of the images prior to image processes. The correction is performed based on image processing condition data which are attached to the processed images. A positional alignment means aligns the positions of the two images. An inter image calculation means performs inter image calculation between unprocessed or corrected images.

25 Claims, 9 Drawing Sheets

U.S. PATENT DOCUMENTS 6,934,409 B2 * 8/2005 Ohara .................. 382/132
7,095,514 B1 * 8/2006 Yamagata et al. .......... 358/1.14
2001/0002934 A1 * 6/2001 Oosawa .................. 382/130
2003/0016853 A1 1/2003 Oosawa

* cited by examiner

IMAGE PROCESSING APPARATUS

BACKGROUND OF THE INVENTION

1. Field of the Invention

The present invention relates to an image processing apparatus, and particularly to an image processing apparatus which is suitable for performing inter image calculations between two processed images of a single subject.

2. Description of the Related Art

Inspection of a single subject, by viewing two or more images thereof and investigating the differences among the images, is being performed in a variety of fields.

For example, in the field of industrial manufacture, an image of a product immediately after manufacture and an image of the same product after durability tests have been administered thereon are comparatively viewed. By paying attention to parts where a large difference exists, parts of the product at which durability should be improved are investigated. In the field of medicine, a physician may comparatively view radiation images of a patient which have been taken at different times. Thereby, occurrence of new disease, a progression of disease, or a treatment state can be understood. Appropriate treatment protocols are investigated based on these understandings.

In the case that two or more images, which are the objects of comparative viewing, are output, it is common for the images to be simply arranged side by side. However, the differences among the images are the areas of greatest interest to a viewer. In the case that two images are simply arranged side by side as described above, it becomes difficult to find the differences as they get smaller. Therefore, there is demand for improved performance in comparative viewing of images.

Therefore, extraction and emphasis of the differences between two images are being performed. This is accomplished by inter image calculation, including subtraction processes, in which positions of structural components (anatomically characteristic positions) in two images are made to correspond to each other (refer to, for example, U.S. Laid-open No. 20010002934). Particularly in the field of medicine, a temporal series subtraction technology has been proposed (refer to A. Kano, K. Doi, H. MacMahon, D. Hassell, M. L. Geiger "Digital Image Subtraction of Temporally Sequential Chest Images for Detection of Interval Change", Med. Phys. 21(3), March 1994, 453-461[1]). This technology generates a difference image between radiation images taken in a temporal series. Aid in diagnosis by observing the generated difference image along with the radiation images taken in a temporal series is being attempted.

A viewer of images is enabled to surely recognize the differences therebetween, by only the differences between images being extracted and emphasized in this manner. Therefore, for example, in the field of medicine, it can be thought that progression or a treatment state of a diseased portion being overlooking will be prevented.

It is desirable that the positions of structural components within images are positionally aligned so that they correspond between images which are to become objects of comparative viewing. This is because the positions of the structural components differ between images, due to changes in the posture of a subject, a difference in an imaging apparatus, and the like. As an example of this positional alignment, a two step process is known (refer to United States Patent Publication No. 20030016853. The two step process involves a first positional alignment operation and a second positional alignment operation. The first positional alignment operation is a global transform (for example, Affine Transform) accomplished by parallel movement, rotation, magnification and reduction of the two images. The second positional alignment operation first divides the images into a plurality of local regions following the first positional alignment operation. Then, the images which have been matched in the corresponding local regions are subjected to nonlinear distortion transform (warping) by curve fitting (for example, a two dimensional tenth degree polynomial).

However, even if the structural components of two images are completely positionally aligned by the process disclosed in Japanese Unexamined Patent Publication No. 8(1996)-335721, there are cases in which specific signal values representing the density or the luminance of each correspondent structural component in the two images do not match. In these cases, artifacts due to the differences in signal values are generated in an inter image calculation image (difference image) obtained by inter image calculation.

Images which are the objects of comparative viewing, that is, which are subject to inter image calculation, are not originally obtained with inter image calculation as an objective. Image processes according to image processing conditions appropriate for each image are administered thereon, so that each image per se is reproducible as a visible image suitable for viewing. Particularly in the case of images obtained in a temporal series, they are obtained with the objective of grasping the state of a subject at the time of image obtainment. Therefore, image processes are administered with image processing conditions which are set for the particular obtained image. Accordingly, it is often the case that images which are the objects of inter image calculation have undergone image processes with image processing conditions which are different from each other. In these cases, the possibility of artifact occurrence is extremely high, because the signal values representing the density or the luminance of each correspondent structural component in the two images do not match.

When images are saved, fundamentally, an image to which image processes have been administered (processed image) and the image prior to image processes having been administered thereon (unprocessed image) are saved. The aforementioned problem can be prevented by performing the inter image calculation employing the unprocessed images.

Recently, however, various standards have been adopted for the transmission and reception of images. Particularly in the field of medicine, standards such as DICOM have become prevalent, and transmission and reception of images via networks and the like have become facilitated. Accompanying this development, images are being exchanged in a variety of formats and states. Images for which only processed images exist are also being exchanged, necessitating inter image calculation between a processed image and an unprocessed image, or between two processed images.

SUMMARY OF THE INVENTION

The present invention has been developed in view of the circumstances described above. It is the object of the present invention to provide an image processing apparatus that enables obtainment of an inter image calculation image (difference image) suitable for viewing from two images, regardless of whether the two images have undergone image processes.

The first and second image processing apparatuses according to the present invention perform correction on images which are to be the objects of inter image calculation, in the case that the images have undergone image processes. The correction corrects the processed images to states equivalent to their unprocessed states, or approximates their unprocessed states. Then, inter image calculation is performed employing unprocessed images or corrected images.

The first image processing apparatus of the present invention is equipped with an inter image calculating means for performing inter image calculations to derive differences between two images of a single subject to obtain a difference image that represents the differences between the two images, wherein:

process confirmation data representing whether an image has undergone image processes is attached to each of the two images, and image processing condition data representing image processing conditions are further attached to the images which have undergone image processes; the image processing apparatus further comprising:

a judgment means for judging whether the two images have undergone image processes, based on the process confirmation data attached to each of the two images; and a correction means for correcting an image which has been judged to have undergone image processes, to correct the image to a state equivalent to its original state prior to the image processes, based on the image processing condition data attached thereto; wherein:

the inter image calculation means performs the inter image calculation employing the corrected image, for the image which has been judged to have undergone image processes.

The second image processing apparatus of the present invention is equipped with an inter image calculating means for performing inter image calculations to derive differences between two images of a single subject to obtain a difference image that represents the differences between the two images, wherein:

process confirmation data representing whether an image has undergone image processes is attached to each of the two images; the image processing apparatus further comprising:

a judgment means for judging whether the two images have undergone image processes, based on the process confirmation data attached to each of the two images; and a correction means for correcting an image which has been judged to have undergone image processes, to cause the image to approximate its original state prior to the image processes, based on typical image processing conditions of image processes which have been administered to the image; wherein:

the inter image calculation means performs the inter image calculation employing the corrected image, for the image which has been judged to have undergone image processes.

The third and fourth image processing apparatuses according to the present invention perform correction on a difference image to be obtained by inter image calculation, in the case that images which are to be the objects of the inter image calculation include an image which has undergone image processes. The correction obtains a difference image equivalent to or approximating that which would be obtained if the inter image calculation was performed employing the two images prior to the image processes.

The third image processing apparatus of the present invention is equipped with an inter image calculating means for performing inter image calculations to derive differences between two images of a single subject to obtain a difference image that represents the differences between the two images, wherein:

process confirmation data representing whether an image has undergone image processes is attached to each of the two images, and image processing condition data representing image processing conditions are further attached to the images which have undergone image processes; the image processing apparatus further comprising:

a judgment means for judging whether the two images have undergone image processes, based on the process confirmation data attached to each of the two images; and a correction means for correcting the difference image to be obtained by the inter image calculation in the case that at least one of the two images have undergone image processes, to obtain a difference image equivalent to that which would be obtained if the inter image calculation was performed employing the two images prior to the image processes, based on the image processing condition data attached thereto.

The fourth image processing apparatus of the present invention is equipped with an inter image calculating means for performing inter image calculations to derive differences between two images of a single subject to obtain a difference image that represents the differences between the two images, wherein:

process confirmation data representing whether an image has undergone image processes is attached to each of the two images, and image processing condition data representing image processing conditions are further attached to the images which have undergone image processes; the image processing apparatus further comprising:

a judgment means for judging whether the two images have undergone image processes, based on the process confirmation data attached to each of the two images; and a correction means for correcting the difference image to be obtained by the inter image calculation in the case that at least one of the two images are judged to have undergone image processes, to obtain a difference image approximating that which would be obtained if the inter image calculation was performed employing the two images prior to the image processes, based on typical image processing conditions of the image processes administered to the at least one of the two images.

Images obtained by ordinary digital cameras, radiation images obtained by Computed Radiography (CR) systems, tomographic images obtained by Computed Tomography (CT) apparatuses or Magnetic Resonance Imaging (MRI) apparatuses, and the like may be employed as the aforementioned images. Note that animals, plants, industrial products, geographic features, astronomical bodies, and landscapes may be employed as the subject of the image, in addition to the human body.

The process confirmation data and the image processing condition data can be written into a header portion of image data which represents an image, for example. A predetermined parameter having set numerical values may be employed as the process confirmation data. The numerical value can represent whether an image is a processed image. For example, if the numerical value of the parameter is 0, the image is an unprocessed image, and if the numerical value of the parameter is 1, the image is a processed image. Specific data that identifies the image processing conditions may be employed as the image processing condition data. Alternatively, another predetermined parameter having numerical values that represent a type of image processing condition, in the case that the image processing conditions are prepared in advance in a plurality of types, may be employed as the image processing condition data. For example, if the image process is a gradation process, in the former case, a representative point on a gradation curve may be expressed in coordinates, to specify the gradation curve. In the latter case, a gradation curve may be specified by the numerical value of the parameter, which corresponds to a type of gradation curve.

A subtraction process, wherein pixels of image data sets each representing an image are made to correspond with each other, is preferably applied as the inter image calculation. In this case, the calculation may be simple subtraction or weighted subtraction. A difference image obtained by a subtraction process is commonly referred to as a subtraction image. Subtraction images include: energy subtraction images obtained based on (simple or weighted subtraction) of two original images having different energy distributions (a high voltage image ordinary radiation image, and a low voltage image) obtained by substantially simultaneous photography; temporal series subtraction images obtained based on two original images obtained at different times; Digital Subtraction Angiography (DSA) images obtained by two original images of blood vessels obtained before and after injection of a contrast agent; and the like.

Regarding the first image processing apparatus, a correction means may be employed which identifies the image processing conditions of an image, which has been judged to be a processed image, based on the image processing condition data, and administers image processes to reverse the effects of the image processes. Thereby, the processed image is corrected to a state equivalent to its original state.

Regarding the second image processing apparatus, a correction means may be employed which assumes that a typical image process, which is commonly administered, has been administered on an image which has been judged to be a processed image, and administers image processes to reverse the effects of the assumed image process. Thereby, the processed image is corrected to approximate its original state.

Regarding the third image processing apparatus, a correction means may be employed which specifies the image processing conditions of the image processes administered on an image, based on the image processing condition data attached to an image which has been judged to be a processed image. An inter image calculation formula is set which enables cancellation of the effects of the image processes and performance of inter image calculation simultaneously. By performing inter image calculation according to the set inter image calculation formula, a difference image obtained by the inter image calculation is corrected to a difference image equivalent to that which would have been obtained had the inter image calculation been performed employing two unprocessed images. Note that the inter image calculation formula which is set in accordance with the specified image processing conditions may be derived either theoretically or empirically.

Regarding the fourth image processing apparatus, a correction means may be employed which assumes that a typical image process, which is commonly administered, has been administered on an image which has been judged to be a processed image. An inter image calculation formula is set in advance which enables cancellation of the effects of the image processes and performance of inter image calculation simultaneously. By performing inter image calculation according to the set inter image calculation formula, a difference image obtained by the inter image calculation is corrected to a difference image approximating that which would have been obtained had the inter image calculation been performed employing two unprocessed images.

Regarding the first and second image processing apparatuses, the image processes may include a gradation process and a frequency process.

Regarding the third and fourth image processing apparatuses, the image processes may include a gradation process.

A gradation process is a process for adjusting the density and the contrast of an image. For example, a gradation curve (a curve representing correspondent relationships between original pixel values and pixel values after conversion) may be set so that density ranges of structural components of interest of a subject are assigned to main gradation levels. Then, pixel value conversion may be performed according to the gradation curve.

A frequency process is a process for adjusting the density of a specific spatial frequency range of an image. For example, a process may be considered which increases the density of a high frequency range in order to heighten the sharpness of an image. As a specific method for realizing this process, pixel values of an original image may be averaged with a predetermined mask size, to generate a so called unsharp image. A differential image between the unsharp image and the original image may be obtained, and the differential image added to the original image.

It is desirable that the first through fourth image processing apparatuses further comprise:

a positional alignment means for aligning the positions of the two images so that structural components of the single subject substantially match; wherein the inter image calculation means performs the inter image calculation between the two images which have been positionally aligned. Note that the positional alignment of the two images may be performed before the correction of the processed images.

Regarding the first through fourth image processing apparatuses, the two images may be images obtained at different times, for comparative viewing with the passage of time. For example, current and past images of the same portion of a patient may be considered.

According to the first image processing apparatus of the present invention, a judgment is made as to whether an image has undergone image processes, based on process confirmation data that represents whether the image is a processed image, which is attached to each of two images of a single subject. An image which has been judged to be a processed image is corrected to a state equivalent to its original state prior to the image processes, based on image processing condition data that represents the image processing condition of the image processes administered thereon, which is attached to the image. Then, inter image calculation is performed between the two images to obtain a difference image. The two images are returned to their original states or equivalents thereof, prior to the inter image calculation. That is, density shift due to image processes is eliminated, and signal values that represent the density of correspondent structural components of a subject substantially match between the two images. Therefore, the occurrence of artifacts in a difference image obtained based on the two images, arising from differences in the aforementioned signal values, can be prevented. Difference images suitable for observation can be obtained regardless of whether the two images are processed images.

There are cases in which inter image calculation is performed on two images of a single subject, to which image processes have been administered according to substantially identical image processing conditions. In these cases, artifacts due to differences in the signal values that represent correspondent structural components are suppressed. However, differences in a density range which has been compressed by image processes become difficult to discern in a difference image. The first image processing apparatus of the present invention corrects two images which are to be the objects of inter image calculation so that they are returned to their original states prior to image processes or equivalents thereof, in which no density shift exists. Therefore, such difficulties in discernment of differences can also be prevented.

According to the second image processing apparatus of the present invention, a judgment is made as to whether an image has undergone image processes, based on process confirmation data that represents whether the image is a processed image, which is attached to each of two images of a single subject. An image which has been judged to be a processed image is corrected to approximate its original state prior to the image processes, based on typical image processing conditions of image processes which are administered on the image. Then, inter image calculation is performed to obtain a difference image. Images which are known to be processed images but for which image processing conditions are unknown are enabled to be corrected to approximate their original states prior to the image processes, based on typical image processing conditions. Therefore, advantageous effects similar to those of the first image processing apparatus can be expected.

According to the third image processing apparatus of the present invention, a judgment is made as to whether an image has undergone image processes, based on process confirmation data that represents whether the image is a processed image, which is attached to each of two images of a single subject. In the case that at least one of the two images is judged to be a processed image, the difference image is corrected, based on image processing condition data that represents the image processing condition of the image processes administered to the image, which is attached to the processed image. The correction obtains a difference image equivalent to that which would be obtained if the inter image calculation was performed employing the two images prior to the image processes. That is, a difference image is obtained equivalent to that obtained if images are employed in which density shift due to image processes is eliminated, and signal values that represent the density of correspondent structural components of a subject substantially match between the two images. Therefore, the occurrence of artifacts in the difference image obtained based on the two images, arising from differences in the aforementioned signal values, can be prevented. Difference images suitable for observation can be obtained regardless of whether the two images are processed images.

There are cases in which inter image calculation is performed on two images of a single subject, to which image processes have been administered according to substantially identical image processing conditions. In these cases, artifacts due to differences in the signal values that represent correspondent structural components are suppressed. However, differences in a density range which has been compressed by image processes become difficult to discern in a difference image. The third image processing apparatus of the present invention obtains a difference image based on two images which are in their original states prior to image processes or equivalents thereof, in which no density shift exists. Therefore, such difficulties in discernment of differences can also be prevented.

According to the fourth image processing apparatus of the present invention, a judgment is made as to whether an image has undergone image processes, based on process confirmation data that represents whether the image is a processed image, which is attached to each of two images of a single subject. In the case that at least one of the two images is judged to be a processed image, the difference image is corrected. The correction obtains a difference image approximating that which would be obtained if the inter image calculation was performed employing the two images prior to the image processes, based on typical image processing conditions of the image processes administered thereon. Even in the case that either or both of the two images is known to be processed images but the image processing conditions are unknown, the difference image is enabled to be corrected as described above. Therefore, advantageous effects similar to those of the first image processing apparatus can be expected.

Note that the first through fourth image processing apparatuses may further comprise: a positional alignment means for aligning the positions of the two images so that structural components of the single subject substantially match; wherein the inter image calculation means performs the inter image calculation between the two images which have been positionally aligned. In this case, artifacts caused by positional misalignment due to changes in the posture of a subject, a difference in an imaging apparatus and the like can be reduced.

BEST MODE FOR CARRYING OUT THE INVENTION

Figure 1:
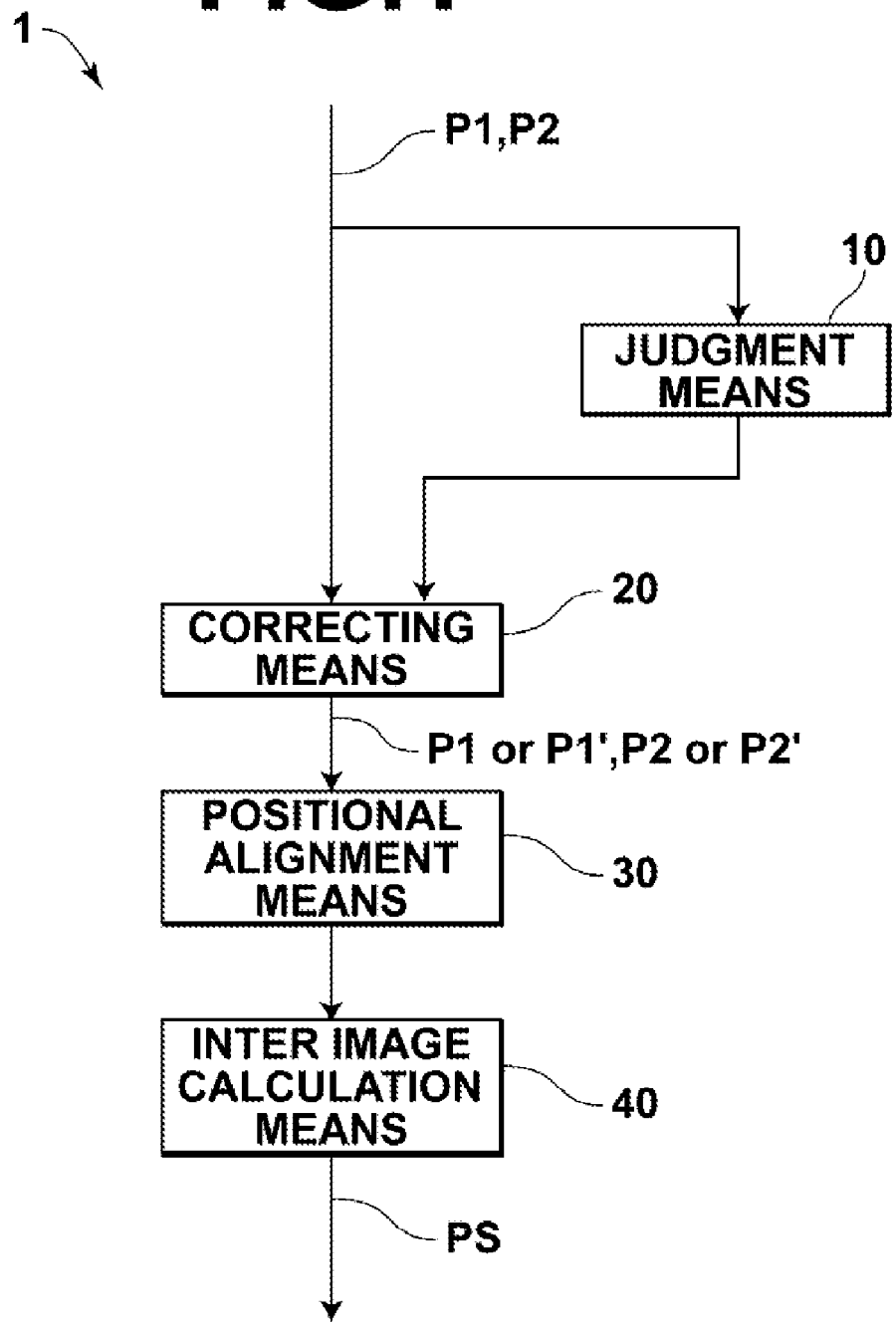
FIG. 1 is a block diagram illustrating the construction of an image processing apparatus according to a first embodiment.

Hereinafter, embodiments of the image processing apparatus according to the present invention will be described. FIG. 1 is a block diagram illustrating the construction of a first embodiment of the image processing apparatus (corresponding to the first image processing apparatus) according to the present invention. Note that in the present embodiment, two images which are the objects of inter image calculation are images of a single subject obtained at different times, for comparative viewing of changes over time. Specifically, the images are chest radiation images of which one is a current image obtained at present, and the other is a past image obtained in the past. A case will be assumed wherein the image processing apparatus 1 obtains a temporal series subtraction image that represents the differences between the two images. The temporal series subtraction image will be provided for observation and diagnosis of newly diseased portions. Process confirmation data Z that represents whether the image has undergone image processes is attached to each of the two images. Further, image processing condition data C that represents the image processing conditions of the image process which has been administered is attached to images which have undergone image processes (processed images).

The image processing apparatus 1 shown in FIG. 1 comprises: a judgment means 10 for judging whether the current and past chest radiation images (hereinafter, referred to as "original images") P1 and P2 are processed images, based on the process confirmation data Z1 and Z2 respectively attached thereto; a correction means 20 for correcting an original image Pi (i is a variable) which has been judged by the judgment means 10 to be a processed image, to obtain a corrected image Pi' which is equivalent to the image prior to image processes being administered thereon (unprocessed image), based on the image processing condition data Ci attached to the image Pi; a positional alignment means 30 for aligning the image P1 (or P1', corrected by the correction means 20, in the case that original image P1 has been judged to be a processed image) and the image P2 (or P2', corrected by the correction means 20, in the case that original image P2 has been judged to be a processed image) so that structural components of the subject therein substantially match; and an inter image calculation means 40 for performing inter image calculation (a subtraction process in the present embodiment) between the image P1 (or P1' corrected by the correction means 20, in the case that original image P1 has been judged to be a processed image) and the image P2 (or P2', in the case that original image P2 has been judged to be a processed image), which have been positionally aligned by the positional alignment means 30, to obtain a difference image PS (a temporal series subtraction image in the present embodiment) that represents the differences between the image P1 (or P1') and the image P2 (or P2').

The original images P1 and P2 are chest radiation images of a human body represented based on digital image data. The digital image data is read out from stimulable phosphor sheets, on which radiation images are recorded. The stimulable phosphor sheet is a radiation detection panel comprising a stimulable phosphor layer. Stimulable phosphors record the energy of radiation irradiated thereon, and emit stimulated phosphorescence corresponding to the amount of radiation energy recorded therein when irradiated with excitation light later. The radiation images are recorded by irradiating radiation onto the chest of a human subject, and recording the radiation which has passed therethrough in the stimulable phosphor sheet. The images P1 and P2 are a current image obtained at present, and a past image obtained in the past. The images P1 and P2 are either unprocessed images to which image processes have not yet been administered, or processed images to which image processes have been administered. Note that the referents of "image processes" are data conversion processes administered to standardized images, according to image processing conditions distinctly set for the purpose of observation or for regions of interest within the subject image. The "image processes" do not include processes for adjusting the gradation of an image obtained by an imaging apparatus, which varies according to imaging conditions, to standardize the gradation thereof.

In the present embodiment, the image processes include a gradation process and a frequency process.

Figure 2A:
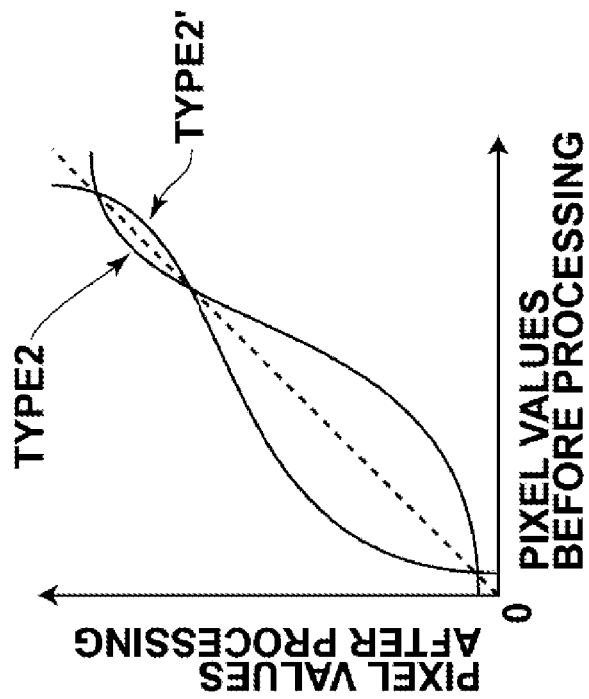
FIG. 2A and FIG. 2B are graphs showing gradation curves employed in gradation processes.

The gradation process converts pixel values according to gradation curves such as those shown in FIG. 2A. The gradation curves represent correspondent relationships between pixel values before and after the gradation process. Note that several types of gradation curves are prepared in advance.

The frequency process is performed based on an emphasis process, called an USM process, according to a formula such as Formula (1) below. An unsharp image Pu is generated by averaging the pixel values of an original image Po with a predetermined mask size. The unsharp image Pu is subtracted from the original image Po, and the difference is multiplied by coefficient $\beta$ ($\beta>0$). The product of the multiplication is added to the original image Po, to obtain an image Po', in which the edges are emphasized.

$$Po' = Po + \beta \times (Po - Pu) \qquad (1)$$

Process confirmation data Z and image processing condition data C are attached to the original image P1 and P2 as header information. Specifically, a parameter Z, which represents whether the image has been processed or not respectively with values of 0 and 1, is attached as the process confirmation data Z. A parameter G representing the type number of the gradation curve employed in the gradation process; and a mask size R and a coefficient $\beta$ employed in the frequency process are attached as the image processing condition data C.

The operation of the image processing apparatus 1 of the present embodiment will be described.

Figure 3B:
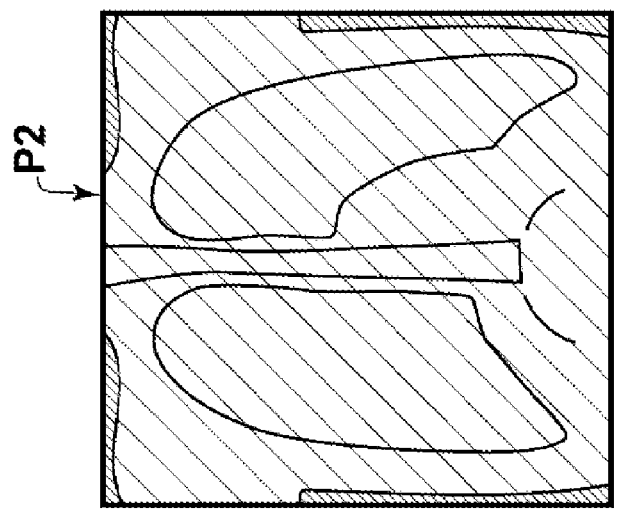
FIG. 3A and FIG. 3B show chest radiation images of a human body, to be input to the image processing apparatus.
Figure 3A:
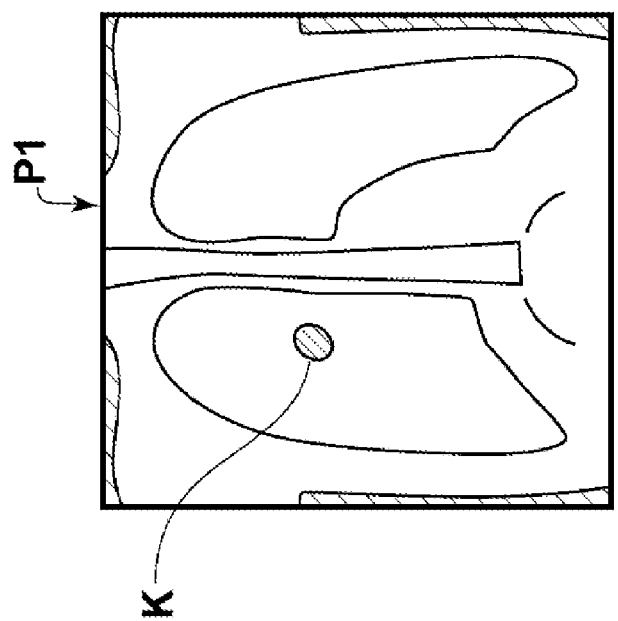

First, original images P1 and P2, which are chest radiation images as shown in FIG. 3A and FIG. 3B, are input to the image processing apparatus 1. The judgment means 10 reads out parameters Z1 and Z2, which are respectively attached to the images P1 and P2 as process confirmation data. A judgment is made regarding whether the images are processed images, based on the values of the parameters Z1 and Z2 (for example, a value of 0 represents an unprocessed image, and a value of 1 represents a processed image). Note that here, it is assumed that the image P1 is an unprocessed current image obtained at present, and that the image P2 is a processed image obtained in the past, to which image processes have been administered. In addition, the image P1 represents a chest having a diseased portion K therein.

Figure 2B:
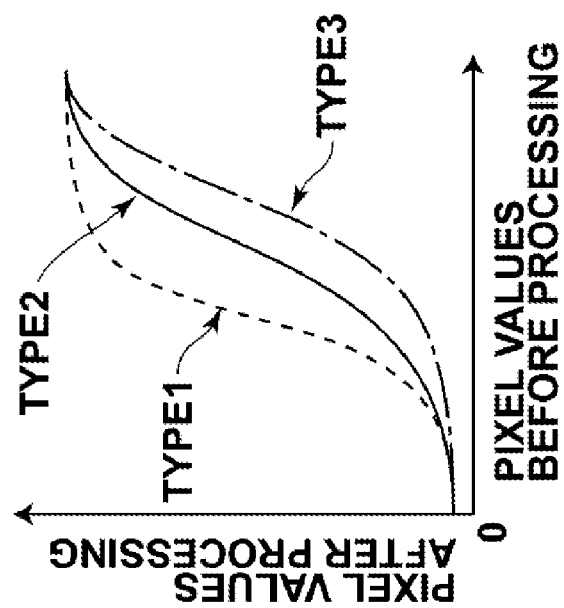

The correction means 20 first reads out the parameter G2 from the header information of the original image P2, which has been judged to be a processed image by the judgment means 10. The type of gradation curve which was employed in the gradation process is determined from the parameter G2. The correction means 20 administers a reverse gradation process on the image P2, by employing a gradation curve having input/output values opposite that of the gradation curve specified by parameter G2. It is assumed that three types of gradation curves, denoted as Type 1, Type 2, and Type 3 in FIG. 2A, are prepared in advance. The value of the parameter G2 specifies the type of gradation curve which was employed in the gradation process. Here, it is assumed that parameter G2=2, that is, that the Type 2 gradation curve was employed. The reverse gradation process is administered on the image P2 employing a gradation curve denoted as Type 2' in FIG. 2B, which as input/output values opposite that of the Type 2 gradation curve.

Then, the correction means 20 reads out the mask size R2 and the coefficient $\beta 2$ from the header information of the original image P2. A reverse frequency process is administered on the image P2 according to Formula (1)' shown below. An unsharp image P2$u$ is generated by averaging the pixels values of the original image P2 with a mask size of R2. The unsharp image P2$u$ is subtracted from the original image P2, and the difference is multiplied by the coefficient $\beta 2$ ($\beta 2>0$). The product of the multiplication is subtracted from the original image P2, to obtain an image P2', in which the edges are blurred. In this manner, the original image P2 is corrected to the image P2', which approximates the image P2 before image processes were administered thereon.

$$P2' = P2 - \beta 2 \times (P2 - P2u) \qquad (1)'$$

Figure 4:
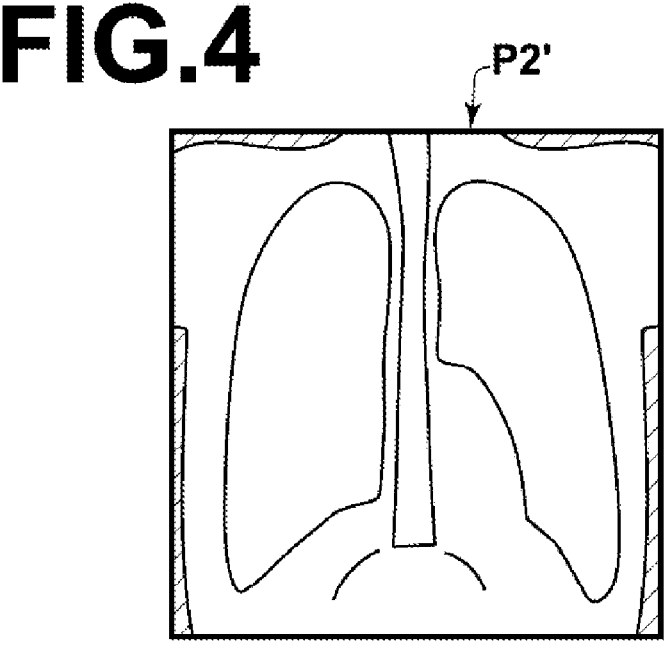
FIG. 4 shows a chest radiation image which has been corrected to an image equivalent to that prior to image processes being administered thereon.

FIG. 4 shows the image P2' which has been obtained in this manner.

The positional alignment means 30 employs known techniques such as affine transform and nonlinear distortion transform (warping) so that one of the images P1 and P2' is caused to match the other. Here, the image P2' is transformed to obtain an image P2'w, which matches the image P1.

The inter image calculation means 40 performs a subtraction process between the images P1 and P2'w according to Formula (2) shown below, to obtain a temporal series subtraction image PS.

$$PS = \text{cont} \times (P1 - P2'w) + \text{mid} \quad (2)$$

wherein "cont" represents a contrast coefficient and "mid" represents a middle value.

Figure 5:
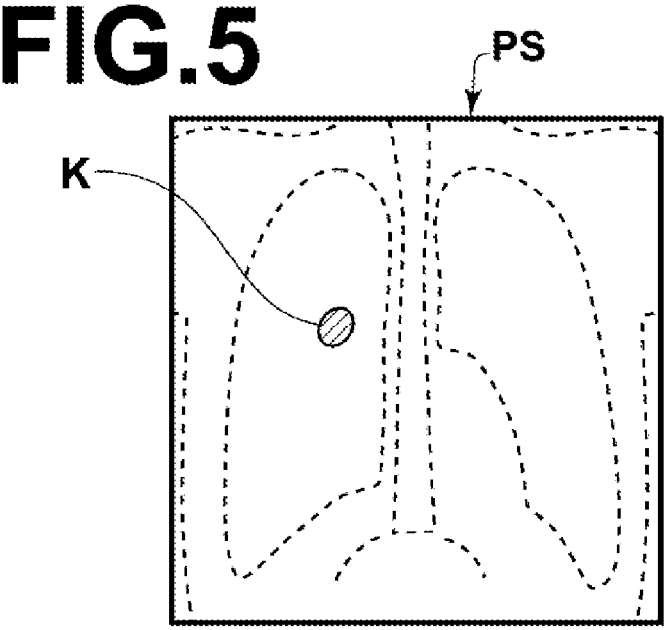
FIG. 5 shows a temporal series subtraction image.

FIG. 5 shows the temporal series subtraction image PS obtained in this manner. An observer is enabled to find the newly developed diseased portion K easily by viewing the temporal series subtraction image PS.

According to the image processing apparatus 1 according to the first embodiment of the present invention, a judgment is made as to whether an image has undergone image processes, based on process confirmation data that represents whether the image is a processed image, which is attached to each of two images of a single subject. An image which has been judged to be a processed image is corrected to a state equivalent to its original state prior to the image processes, based on image processing condition data that represents the image processing condition of the image processes administered thereon, which is attached to the image. Then, inter image calculation is performed between the two images to obtain a difference image. The two images are returned to their original states or equivalents thereof, prior to the inter image calculation. That is, density shift due to image processes is eliminated, and signal values that represent the density of correspondent structural components of a subject substantially match between the two images. Therefore, the occurrence of artifacts in a difference image obtained based on the two images, arising from differences in the aforementioned signal values, can be prevented. Difference images suitable for observation can be obtained regardless of whether the two images are processed images.

There are cases in which inter image calculation is performed on two images of a single subject, to which image processes have been administered according to substantially identical image processing conditions. In these cases, artifacts due to differences in the signal values that represent correspondent structural components are suppressed. However, differences in a density range which has been compressed by image processes become difficult to discern in a difference image. The image processing apparatus 1 according to the first embodiment corrects two images which are to be the objects of inter image calculation so that they are returned to their original states prior to image processes or equivalents thereof, in which no density shift exists. Therefore, such difficulties in discernment of differences can also be prevented.

A second embodiment of the image processing apparatus according to the present invention (corresponding to the second image processing apparatus), based on the first embodiment, will now be described. In the second embodiment, original images P1 and P2 to be input have at least process confirmation data Z attached thereto (regardless of whether image processing condition data C are attached). A correction means 20 corrects images which have been judged to be processed images by a judgment means 10, based on typical image processing conditions of image processes administered to the images. That is, the correction means 20 administers image processes having image processing conditions opposite the typical image processing conditions on the images. A corrected image approximating an unprocessed image is obtained thereby. In this case, a judgment is made as to whether an image has undergone image processes, based on process confirmation data that represents whether the image is a processed image, which is attached to each of two images of a single subject. An image which has been judged to be a processed image is corrected to approximate its original state prior to the image processes, based on typical image processing conditions of image processes which are administered on the image. Then, inter image calculation is performed to obtain a difference image. Images which are known to be processed images but for which image processing conditions are unknown are enabled to be corrected to approximate their original states prior to the image processes, based on typical image processing conditions. Therefore, advantageous effects similar to those of the image processing apparatus 1 according to the first embodiment can be expected.

Figure 6:
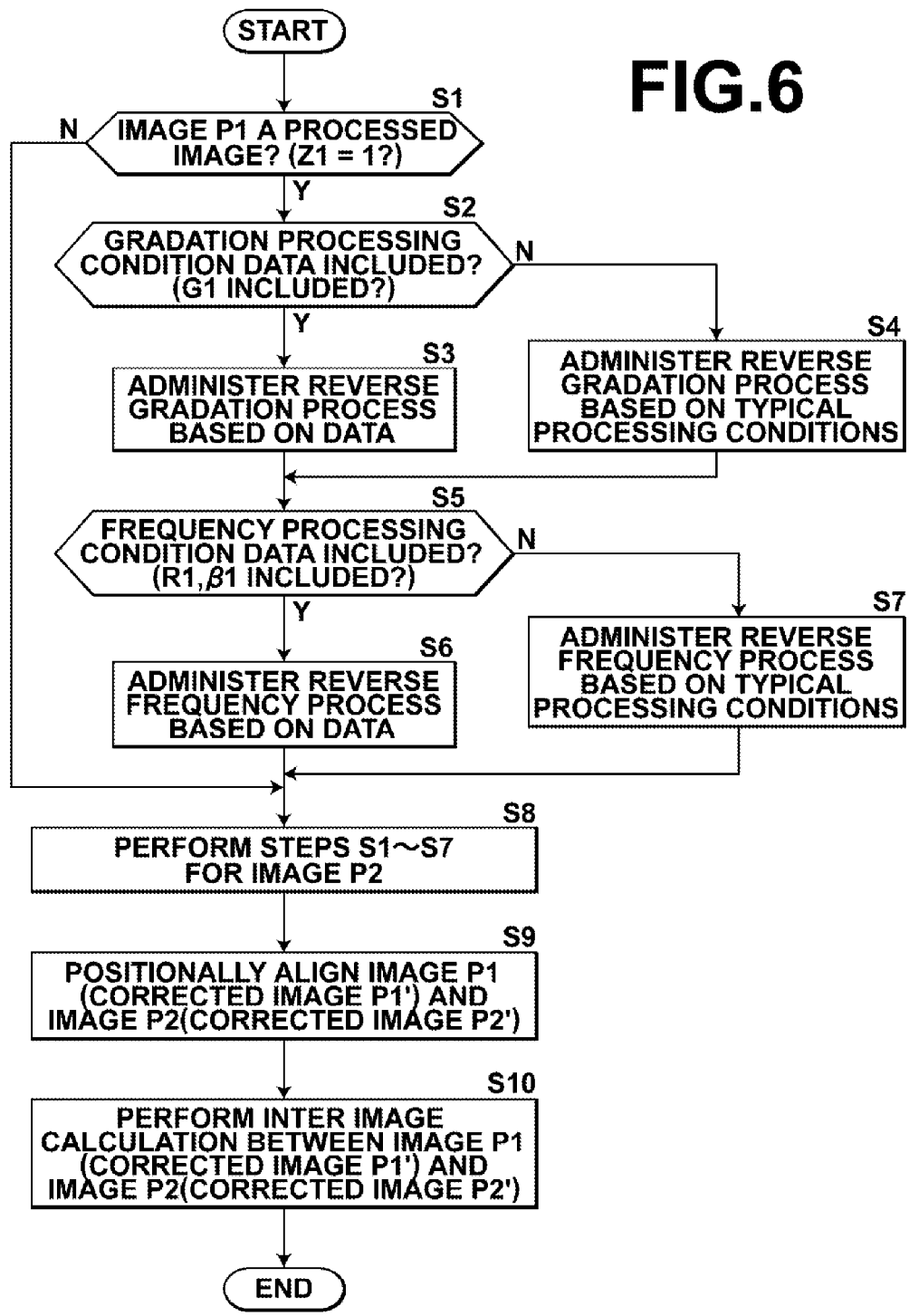
FIG. 6 shows a flow chart of processes performed by an image processing apparatus according to a third embodiment.

A third embodiment of the image processing apparatus according to the present invention (corresponding to a combination of the first and second image processing apparatuses), based on the first embodiment, will now be described. In the third embodiment, original images P1 and P2 to be input have at least process confirmation data Z attached thereto (regardless of whether image processing condition data C are attached). A correction means 20 corrects an image which has been judged to be processed images by a judgment means 10, based on image processing condition data C, in the case that the image processing condition data C is attached to the image. That is, the correction means 20 administers image processes on the image opposite to that which has been administered previously, to correct the image to a state equivalent to that of an unprocessed image. In the case that the image processing condition data C is not attached to the image, the correction means 20 corrects the image based on typical image processing conditions of image processes administered to the images. That is, the correction means 20 administers image processes having image processing conditions opposite the typical image processing conditions on the images. A corrected image approximating an unprocessed image is obtained thereby. Specifically, the image processing apparatus of the third embodiment performs processes according to a process flow such as that shown in FIG. 6.

First, a parameter Z1 is readout from header information of the input original image P1, to judge whether it is a processed image (Step S1). In the case that the image P1 is not a processed image, the process proceeds to processes regarding the image P2. In the case that the image P1 is a processed image, whether a parameter G1, which specifies a gradation curve employed in a gradation process, is included in the header information is judged (Step S2). In the case that the parameter G1 is included, the parameter G1 is read out from the header information to specify the type of gradation curve employed in the gradation process. Then, a reverse gradation process is administered on the image P1, according to a gradation curve having input/output values opposite that of the specified gradation curve (Step S3). In the case that the parameter G1 is not included, a reverse gradation process is administered on the image P1, according to a gradation curve having input/output values opposite that of a typical gradation curve which is employed in a gradation process administered on the image P1 (for example, a gradation curve most commonly used for a type of subject) (Step S4). Then, whether a mask size R1 and a coefficient $\beta 1$, employed in a frequency process, are included in the header information is judged (Step S5). In the case that the mask size R1 and the coefficient $\beta 1$ are included, R1 and β1 are read out from the header information. Then, a reverse frequency process is administered on the original image P1 according to Formula (1)" shown below (Step S6). In the reverse frequency process, an unsharp image P1u is generated by averaging the pixels values of the original image P1 with a mask size of R1. The unsharp image P1u is subtracted from the original image P1, and the difference is multiplied by the coefficient β1 (β1>0). The product of the multiplication is subtracted from the original image P1 to obtain an image P1', in which the edges are blurred.

$$P1' = P1 - \beta 1 \times (P1 - P1u) \qquad (1)''$$

In the case that the mask size R1 and the coefficient β1 are not included, R1 and β1 are set based on a typical frequency process which is administered on the image P1, and a reverse frequency process is administered according to Formula (1)" (Step S7).

Thereafter, processes similar to steps S1 through S7 are performed with respect to the original image P2. In the case that the image P2 is a processed image, correction is performed to correct the image P2 to a state equivalent to or approximating an unprocessed image (Step S8). Then, the image P1 (or corrected image P1') and the image P2 (or corrected image P2') are positionally aligned (Step S9). Finally, inter image calculation is performed between the images P1 and P2, which have been corrected to states as close as possible to their unprocessed states (Step S10).

The first, second and third embodiments described above are equipped with the positional alignment means 30 for aligning the positions of the two images so that structural components of the single subject substantially match. Therefore, artifacts caused by positional misalignment due to changes in the posture of a subject, a difference in an imaging apparatus and the like can be reduced in the difference image obtained by the inter image calculation means 40. Accordingly, a difference image can be obtained which is more suitable for observation. Note that the positional alignment means 30 is not strictly necessary in the image processing apparatus 1. There are cases in which the two images which are the objects of inter image calculation are in a state such that substantially no positional misalignment exists therebetween. In these cases, a difference image suitable for effective observation can be obtained without performing positional alignment.

Note that the process confirmation data Z may be provided separately from the image processing condition data C, as in the above embodiments. Alternatively, the image processing condition data C may also serve as the process confirmation data Z. A value of, for example, 0, for a parameter which specifies image processing conditions may represent that the image is an unprocessed image.

Regarding the third embodiment, the process confirmation data Z may be provided for each type of image process. In this case, a judgment is made regarding whether image processes have been administered for each type of image process. Whether to perform correction may be determined for each type of image process, based on the result of the judgment.

Note that a frequency process is a process for adjusting the density of a portion of the image, such as an outline of a subject. Therefore, the chances of mismatched density values between images due to a frequency process contributing to artifacts in a difference image is small when compared to a gradation process. Accordingly, sufficiently effective correction may be performed by correcting only for a gradation process, in the case that both a gradation process and a frequency process have been administered.

Figure 7:
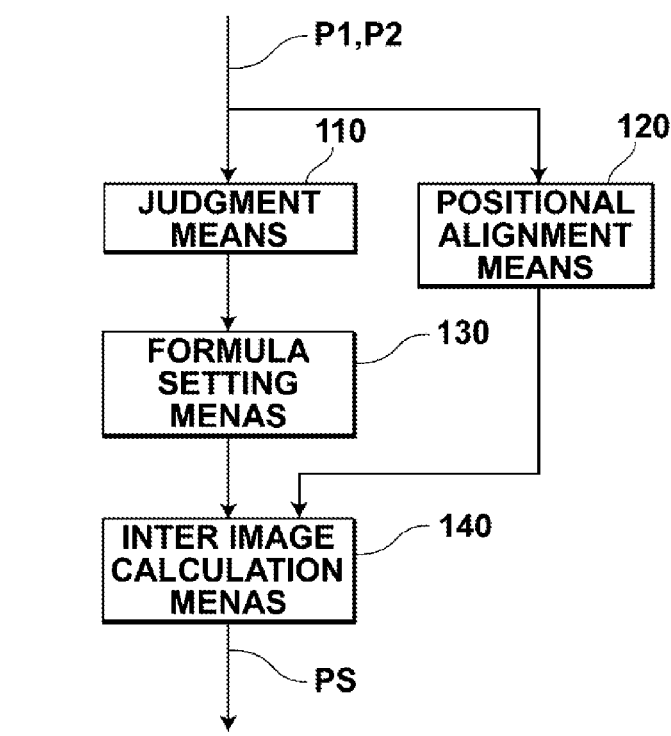
FIG. 7 is a block diagram illustrating the construction of an image processing apparatus according to a fourth embodiment.

Alternate embodiments of the image processing apparatus according to the present invention will be described. FIG. 7 is a block diagram illustrating the construction of a fourth embodiment of the image processing apparatus (corresponding to the third image processing apparatus) according to the present invention. Note that in the present embodiment, two images which are the objects of inter image calculation are images of a single subject obtained at different times, for comparative viewing of changes over time. Specifically, the images are chest radiation images of which one is a current image obtained at present, and the other is a past image obtained in the past. A case will be assumed wherein the image processing apparatus 2 obtains a temporal series subtraction image that represents the differences between the two images. The temporal series subtraction image will be provided for observation and diagnosis of newly diseased portions. Process confirmation data Z that represents whether the image has undergone image processes is attached to each of the two images. Further, image processing condition data C that represents the image processing conditions of the image process which has been administered is attached to images which have undergone image processes (processed images).

The image processing apparatus 2 shown in FIG. 7 comprises: a judgment means 110 for judging whether the current and past chest radiation images (hereinafter, referred to as "original images") P1 and P2 are processed images, based on the process confirmation data Z1 and Z2 respectively attached thereto; a positional alignment means 120 for aligning the image P1 and the image P2 so that structural components of the subject therein substantially match; a formula setting means 130 for setting an inter image calculation formula which enables cancellation of the effects of the image processes on images which have been judged to be processed images by the judgment means 110, based on the image processing condition data Ci (i is a variable) attached thereto, and inter image calculation (a subtraction process in the present embodiment) simultaneously; and performance of an inter image calculation means 140 for performing inter image calculation between the image P1 and the image P2, which have been positionally aligned by the positional alignment means 120, according to the inter image calculation formula set by the formula setting means 130, to obtain a difference image PS (a temporal series subtraction image in the present embodiment) equivalent to that which would be obtained if the inter image calculation was performed between the images P1 and P2 prior to image processes being administered thereon.

The original images P1 and P2 are chest radiation images of a human body represented based on digital image data. The digital image data is read out from stimulable phosphor sheets, on which radiation images are recorded. The stimulable phosphor sheet is a radiation detection panel comprising a stimulable phosphor layer. Stimulable phosphors record the energy of radiation irradiated thereon, and emit stimulated phosphorescence corresponding to the amount of radiation energy recorded therein when irradiated with excitation light later. The radiation images are recorded by irradiating radiation onto the chest of a human subject, and recording the radiation which has passed therethrough in the stimulable phosphor sheet. The images P1 and P2 are a current image obtained at present, and a past image obtained in the past. The images P1 and P2 are either unprocessed images to which image processes have not yet been administered, or processed images to which image processes have been administered. Note that the referents of "image processes" are data conversion processes administered to standardized images, according to image processing conditions distinctly set for the purpose of observation or for regions of interest within the subject image. The "image processes" do not include processes for adjusting the gradation of an image obtained by an imaging apparatus, which varies according to imaging conditions, to standardize the gradation thereof.

In the present embodiment, the image process is a gradation process.

Figure 8:
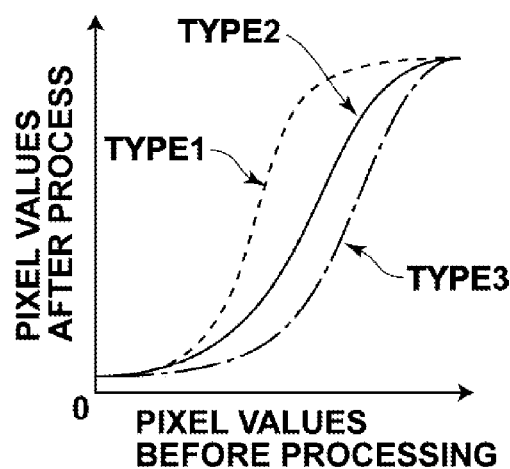
FIG. 8 is a graph showing different types of gradation curves employed in a gradation process.

The gradation process converts pixel values according to gradation curves such as those shown in FIG. 8. The gradation curves represent correspondent relationships between pixel values before and after the gradation process. Note that several types of gradation curves are prepared in advance.

Process confirmation data Z and image processing condition data C are attached to the original image P1 and P2 as header information. Specifically, a parameter Z, which represents whether the image has been processed or not respectively with values of 0 and 1, is attached as the process confirmation data Z. A parameter G representing the type number of the gradation curve employed in the gradation process is attached as the image processing condition data C.

The operation of the image processing apparatus 2 of the present embodiment will be described.

Figure 9A:
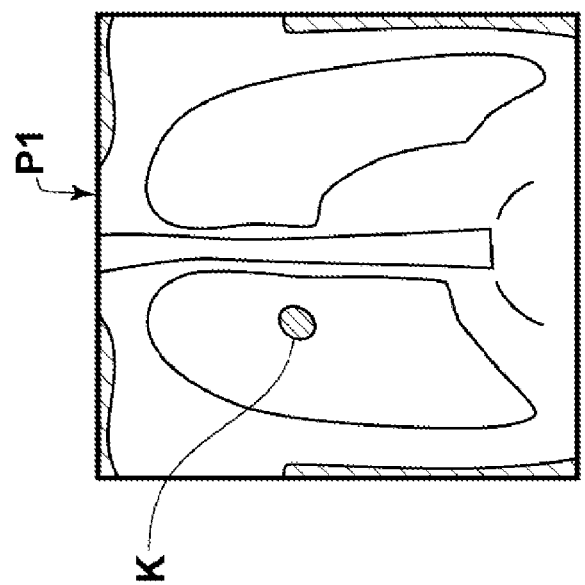
FIG. 9A and FIG. 9B show chest radiation images of a human body, to be input to the image processing apparatus.
Figure 9B:
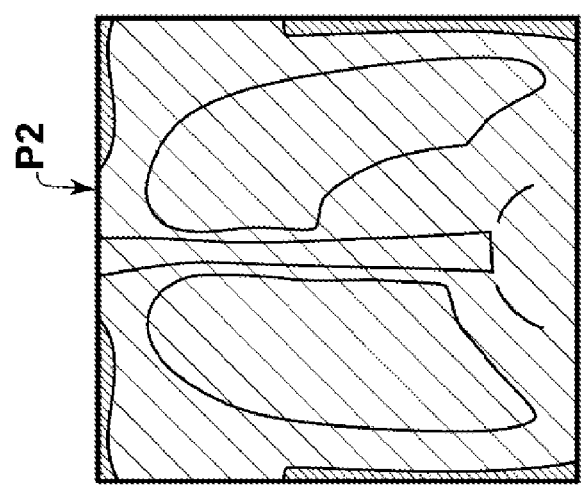

First, original images P1 and P2, which are chest radiation images as shown in FIG. 9A and FIG. 9B, are input to the image processing apparatus 1. The judgment means 110 reads out parameters Z1 and Z2, which are respectively attached to the images P1 and P2 as process confirmation data. A judgment is made regarding whether the images are processed images, based on the values of the parameters Z1 and Z2 (for example, a value of 0 represents an unprocessed image, and a value of 1 represents a processed image). Note that here, it is assumed that the image P1 is an unprocessed current image obtained at present, and that the image P2 is a processed image obtained in the past, to which image processes have been administered. In addition, the image P1 represents a chest having a diseased portion K therein.

The positional alignment means 120 employs known techniques such as affine transform and nonlinear distortion transform (warping) so that one of the images P1 and P2 is caused to match the other. Here, the image P2 is transformed to obtain an image P2w, which matches the image P1.

The formula setting means 130 reads out parameter G2 from the header information of the original image P2, which has been judged to be a processed image by the judgment means 110. The type of gradation curve which was employed in the gradation process is determined from the parameter G2. The formula setting means 130 sets an inter image calculation formula that enables cancellation of the gradation process which employed the determined gradation curve and performance of inter image calculation, simultaneously. The inter image calculation (subtraction process) is performed according to a formula such as that shown as Formula (3) below, to obtain a temporal series subtraction image PS.

$$PS = \text{cont} \times (a \times P1 - b \times P2w) + \text{mid} \quad (3)$$

wherein "cont" represents a contrast coefficient, "a" and "b" represent coefficients, and "mid" represents a middle value.

Figure 10:
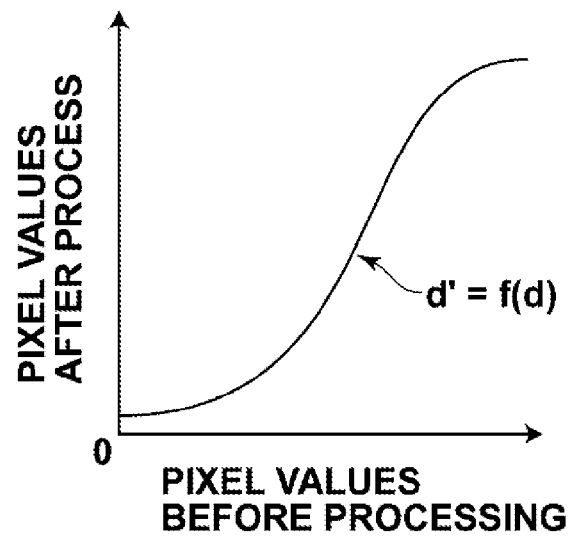
FIG. 10 is a graph showing a gradation curve employed in a gradation process.

In an ordinary subtraction process, calculation is performed with the coefficients a and b both equal to 1. However, a gradation process has been administered on the image P2 employing a gradation curve such as that shown in FIG. 10. A function representing this gradation curve is expressed as d'=f(d). An inter image calculation formula is with: cont=a desired value, a=1, and b=f$^{-1}$ is set, to yield Formula (3)' shown below.

$$PS = \text{cont} \times (P1 - f^{-1}(P2w)) + \text{mid} \quad (3)'$$

The inter image calculation means 140 performs inter image calculation according to Formula (3)', and obtains a temporal series subtraction image PS. The temporal series subtraction image PS is equivalent to a difference image which would have been obtained had ordinary inter image calculation been performed employing the original images P1 and P2 prior to image processes being administered thereon.

Figure 11:
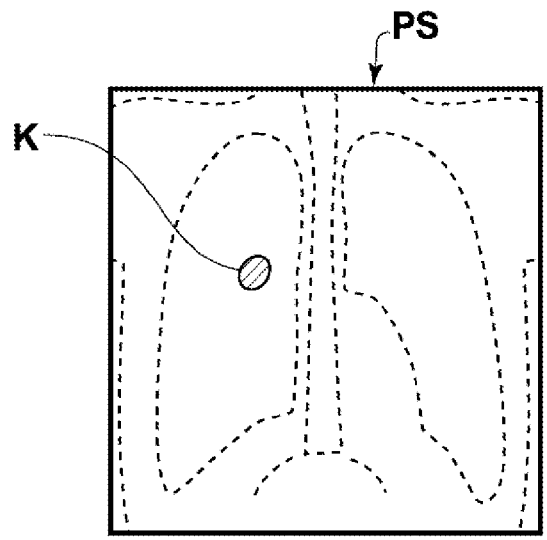
FIG. 11 shows a temporal series subtraction image.

FIG. 11 shows the temporal series subtraction image PS obtained in this manner. An observer is enabled to find the newly developed diseased portion K easily by viewing the temporal series subtraction image PS.

According to the image processing apparatus 2 according to the fourth embodiment, a judgment is made as to whether an image has undergone image processes, based on process confirmation data that represents whether the image is a processed image, which is attached to each of two images of a single subject. In the case that at least one of the two images is judged to be a processed image, the difference image is corrected based on image processing condition data that represents the image processing condition of the image processes administered to the image, which is attached to the processed image. The correction obtains a difference image equivalent to that which would be obtained if the inter image calculation was performed employing the two images prior to the image processes. That is, a difference image is obtained equivalent to that obtained if images are employed in which density shift due to image processes is eliminated, and signal values that represent the density of correspondent structural components of a subject substantially match between the two images. Therefore, the occurrence of artifacts in the difference image obtained based on the two images, arising from differences in the aforementioned signal values, can be prevented. Difference images suitable for observation can be obtained regardless of whether the two images are processed images.

There are cases in which inter image calculation is performed on two images of a single subject, to which image processes have been administered according to substantially identical image processing conditions. In these cases, artifacts due to differences in the signal values that represent correspondent structural components are suppressed. However, differences in a density range which has been compressed by image processes become difficult to discern in a difference image. The third image processing apparatus of the present invention obtains a difference image based on two images which are in their original states prior to image processes or equivalents thereof, in which no density shift exists. Therefore, such difficulties in discernment of differences can also be prevented.

A fifth embodiment of the image processing apparatus according to the present invention (corresponding to the fourth image processing apparatus), based on the fourth embodiment, will now be described. In the fifth embodiment, original images P1 and P2 to be input have at least process confirmation data Z attached thereto (regardless of whether image processing condition data C are attached). A formula setting means 130 assumes that a typical image process, which is commonly administered, has been administered on an image which has been judged to be a processed image by a judgment means 110. The formula setting means 130 sets an inter image calculation formula which enables cancellation of the effects of the image processes and performance of inter image calculation simultaneously. In this case, a judgment is made as to whether an image has undergone image processes, based on process confirmation data that represents whether the image is a processed image, which is attached to each of two images of a single subject. In the case that at least one of the two images is judged to be a processed image, the difference image is corrected, based on typical image processing conditions of the image processes administered on the image. The correction obtains a difference image approximating that which would be obtained if the inter image calculation was performed employing the two images prior to the image processes. Even in the case that either or both of the two images is known to be processed images but the image processing conditions are unknown, the difference image is enabled to be corrected as described above. Therefore, advantageous effects similar to those of the first image processing apparatus can be expected.

Figure 12:
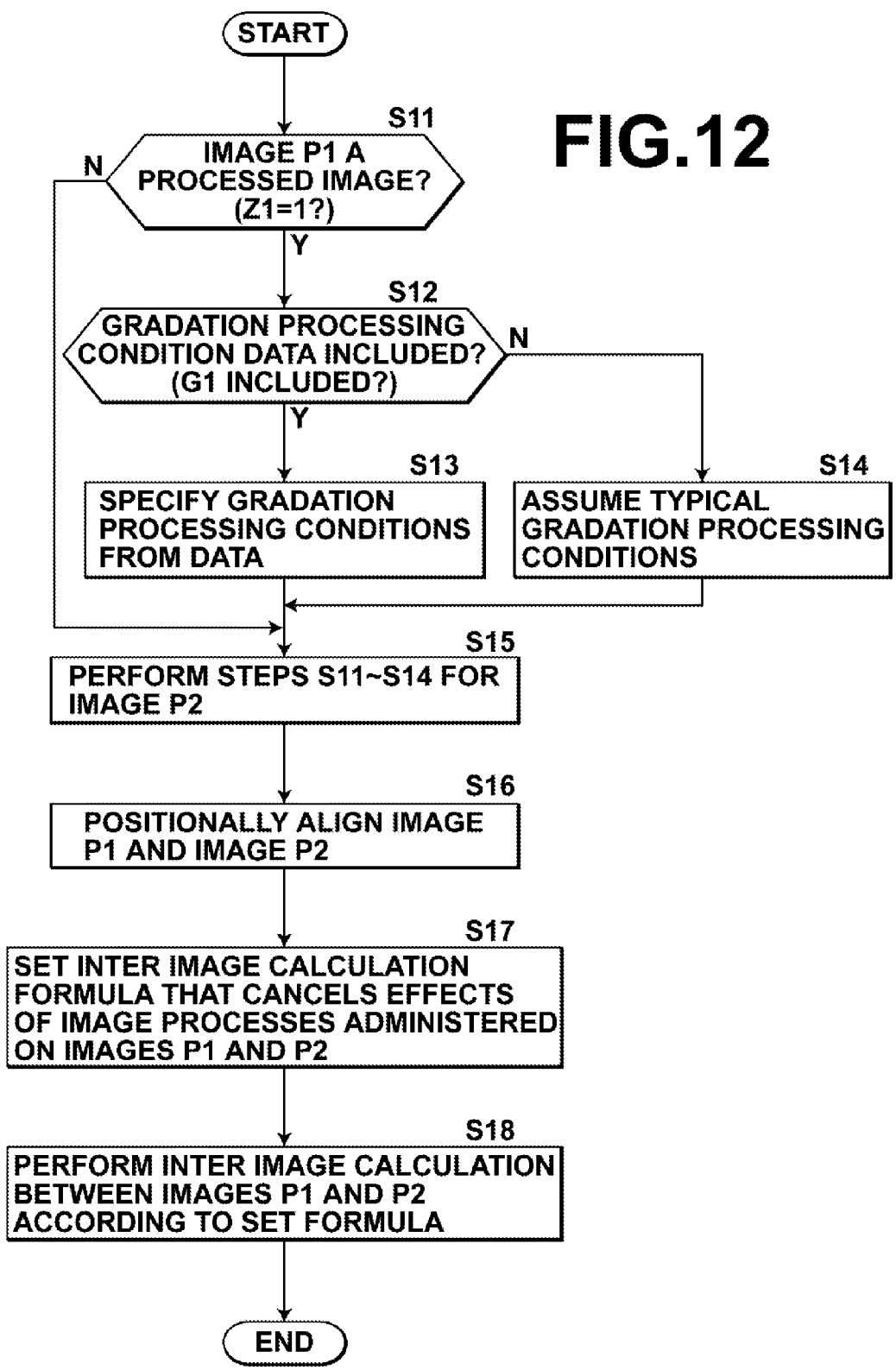
FIG. 12 shows a flow chart of processes performed by an image processing apparatus according to a sixth embodiment.

A sixth embodiment of the image processing apparatus according to the present invention (corresponding to a combination of the third and fourth image processing apparatuses), based on the fourth embodiment, will now be described. In the sixth embodiment, original images P1 and P2 to be input have at least process confirmation data Z attached thereto (regardless of whether image processing condition data C are attached). A formula setting means 130 sets an inter image calculation formula that enables cancellation of the effects of image processes administered on images, which have been judged to be processed images by a judgment means 110, and performance of inter image calculation simultaneously. The inter image calculation formula is set based on image processing condition data C, in the case that the image processing condition data C is attached to the processed image. The inter image calculation formula is set based on typical image processing conditions of image processes administered to the processed image, in the case that the image processing condition data C is not attached to the processed image. The inter image calculation means performs inter image calculation according to the set inter image calculation formula, to obtain a difference image which is as close as possible to a difference image which would be obtained if the inter image calculation was performed with the images before image processes were administered thereon. Specifically, the image processing apparatus of the sixth embodiment performs processes according to a process flow such as that shown in FIG. 12.

First, a parameter Z1 is read out from header information of the input original image P1, to judge whether it is a processed image (Step S11). In the case that the image P1 is not a processed image, the process proceeds to processes regarding the image P2. In the case that the image P1 is a processed image, whether a parameter G1, which specifies a gradation curve employed in a gradation process, is included in the header information is judged (Step S12). In the case that the parameter G1 is included, the parameter G1 is read out from the header information to specify the type of gradation curve employed in the gradation process (Step S13). In the case that the parameter G1 is not included, it is assumed that a gradation process has been administered employing a typical gradation curve (for example, a gradation curve most commonly used for a type of subject) (Step S14).

Next, processes similar to steps S11 through S14 are performed with respect to the original image P2. That is, in the case that the image P2 is a processed image, image processing conditions therefor are specified or estimated (Step S15).

Thereafter, the images P1 and P2 are positionally aligned (Step S16). An inter image calculation formula is set that enables cancellation of the effects of image processes which have been administered or assumed to have been administered on the images P1 and P2, and performance of an inter image calculation simultaneously (Step S17). The inter image calculation formula is set based on data related to the image processing conditions, or on data related to typical image processing conditions. Finally, inter image calculation is performed according to the set formula, to obtain an image in a state which is as close as possible to that of a difference image which would be obtained if the images P1 and P2, prior to image processes being administered thereto, were employed (Step S18).

The fourth, fifth and sixth embodiments described above are equipped with the positional alignment means 120 for aligning the positions of the two images so that structural components of the single subject substantially match. Therefore, artifacts caused by positional misalignment due to changes in the posture of a subject, a difference in an imaging apparatus and the like can be reduced in the difference image obtained by the inter image calculation means 140. Accordingly, a difference image can be obtained which is more suitable for observation. Note that the positional alignment means 120 is not strictly necessary in the image processing apparatus 2. There are cases in which the two images which are the objects of inter image calculation are in a state such that substantially no positional misalignment exists therebetween. In these cases, a difference image suitable for effective observation can be obtained without performing positional alignment.

Note that the process confirmation data Z may be provided separately from the image processing condition data C, as in the above embodiments. Alternatively, the image processing condition data C may also serve as the process confirmation data Z. A value of, for example, 0, for a parameter which specifies image processing conditions may represent that the image is an unprocessed image.

Regarding the sixth embodiment, the process confirmation data Z may be provided for different types of image processes. In this case, a judgment is made regarding whether image processes have been administered for each type of image process. The inter image calculation formula may be set, based on the result of the judgment. In addition, a judgment may be made regarding whether image processing condition data C are attached for each type of image process, for an image which has been judged to be a processed image. In the case that the image processing condition data C are attached, the formula is set based on the image processing condition data C. In the case that the image processing condition data C are not attached, the formula is set based on typical image processing conditions for the image process.

What is claimed is:

1. An image processing apparatus comprising:
   an inter image calculating means for performing inter image calculations to derive differences between two images of a single subject to obtain a difference image that represents the differences between the two images, wherein:
   process confirmation data representing whether an image has undergone image processes is attached to each of the two images, and image processing condition data representing image processing conditions are further attached to the images which have undergone image processes;
   the image processing apparatus further comprising:
   a judgment means for judging whether the two images have undergone image processes, based on the process confirmation data attached to each of the two images; and
   a correction means for correcting an image which has been judged to have undergone image processes, to correct the image to a state equivalent to its original state prior to the image processes, based on the image processing condition data attached thereto; wherein:

the inter image calculation means performs the inter image calculation employing the corrected image, for the image which has been judged to have undergone image processes.

2. An image processing apparatus as defined in claim 1, wherein:
the image processes include a gradation process.

3. An image processing apparatus as defined in claim 1, wherein:
the image processes include a frequency process.

4. An image processing apparatus as defined in claim 1, further comprising:
a positional alignment means for aligning the positions of the two images so that structural components of the single subject substantially match; wherein
the inter image calculation means performs the inter image calculation between the two images which have been positionally aligned.

5. An image processing apparatus as defined in claim 2, further comprising:
a positional alignment means for aligning the positions of the two images so that structural components of the single subject substantially match; wherein
the inter image calculation means performs the inter image calculation between the two images which have been positionally aligned.

6. An image processing apparatus as defined in claim 3, further comprising:
a positional alignment means for aligning the positions of the two images so that structural components of the single subject substantially match; wherein
the inter image calculation means performs the inter image calculation between the two images which have been positionally aligned.

7. An image processing apparatus comprising:
an inter image calculating means for performing inter image calculations to derive differences between two images of a single subject to obtain a difference image that represents the differences between the two images, wherein:
process confirmation data representing whether an image has undergone image processes is attached to each of the two images; the image processing apparatus further comprising:
a judgment means for judging whether the two images have undergone image processes, based on the process confirmation data attached to each of the two images; and
a correction means for correcting an image which has been judged to have undergone image processes, to cause the image to approximate its original state prior to the image processes, based on typical image processing conditions of image processes which have been administered to the image; wherein:
the inter image calculation means performs the inter image calculation employing the corrected image, for the image which has been judged to have undergone image processes.

8. An image processing apparatus as defined in claim 7, wherein:
the image processes include a gradation process.

9. An image processing apparatus as defined in claim 7, wherein:
the image processes include a frequency process.

10. An image processing apparatus as defined in claim 7, further comprising:
a positional alignment means for aligning the positions of the two images so that structural components of the single subject substantially match; wherein
the inter image calculation means performs the inter image calculation between the two images which have been positionally aligned.

11. An image processing apparatus as defined in claim 8, further comprising:
a positional alignment means for aligning the positions of the two images so that structural components of the single subject substantially match; wherein
the inter image calculation means performs the inter image calculation between the two images which have been positionally aligned.

12. An image processing apparatus as defined in claim 9, further comprising:
a positional alignment means for aligning the positions of the two images so that structural components of the single subject substantially match; wherein
the inter image calculation means performs the inter image calculation between the two images which have been positionally aligned.

13. An image processing apparatus comprising:
an inter image calculating means for performing inter image calculations to derive differences between two images of a single subject to obtain a difference image that represents the differences between the two images, wherein:
process confirmation data representing whether an image has undergone image processes is attached to each of the two images, and image processing condition data representing image processing conditions are further attached to the images which have undergone image processes; the image processing apparatus further comprising:
a judgment means for judging whether the two images have undergone image processes, based on the process confirmation data attached to each of the two images; and
a correction means for correcting the difference image to be obtained by the inter image calculation in the case that at least one of the two images have undergone image processes, to obtain a difference image which would be obtained if the inter image calculation was performed employing the two images prior to the image processes, based on the image processing condition data attached thereto.

14. An image processing apparatus as defined in claim 13, wherein:
the image processes include a gradation process.

15. An image processing apparatus as defined in claim 13, further comprising:
a positional alignment means for aligning the positions of the two images so that structural components of the single subject substantially match; wherein
the inter image calculation means performs the inter image calculation between the two images which have been positionally aligned.

16. An image processing apparatus as defined in claim 14, further comprising:
a positional alignment means for aligning the positions of the two images so that structural components of the single subject substantially match; wherein
the inter image calculation means performs the inter image calculation between the two images which have been positionally aligned.

17. An image processing apparatus comprising:
an inter image calculating means for performing inter image calculations to derive differences between two images of a single subject to obtain a difference image that represents the differences between the two images, wherein:

process confirmation data representing whether an image has undergone image processes is attached to each of the two images; the image processing apparatus further comprising:

a judgment means for judging whether the two images have undergone image processes, based on the process confirmation data attached to each of the two images; and a correction means for correcting the difference image to be obtained by the inter image calculation in the case that at least one of the two images are judged to have undergone image processes, to obtain a difference image approximating that which would be obtained if the inter image calculation was performed employing the two images prior to the image processes, based on typical image processing conditions of the image processes administered to the at least one of the two images.

18. An image processing apparatus as defined in claim 17, wherein:
the image processes include a gradation process.

19. An image processing apparatus as defined in claim 17, further comprising:

a positional alignment means for aligning the positions of the two images so that structural components of the single subject substantially match; wherein the inter image calculation means performs the inter image calculation between the two images which have been positionally aligned.

20. An image processing apparatus as defined in claim 18, further comprising:

a positional alignment means for aligning the positions of the two images so that structural components of the single subject substantially match; wherein the inter image calculation means performs the inter image calculation between the two images which have been positionally aligned.

21. An image processing apparatus as defined in claim 1, wherein the process confirmation data and image processing conditions are attached to each of the two images as parameters written into a header portion of each of the two images.

22. A method for deriving the differences between two images of a single subject to obtain a difference image that represents the differences between the two images, wherein one or more processors implement the method comprising:

judging whether the two images have undergone image processing, based on process confirmation data attached to each of the two images;

correcting an image which has been judged to have undergone image processing to correct the image to a state equivalent to its original state prior to the image processing, based on image processing condition data attached thereto; and performing an inter image calculation employing the corrected image for the image which has been judged to have undergone image processing; wherein the process confirmation data represents whether an image has undergone image processing, and is attached to each of the two images, and the image processing condition data represents image processing conditions, and are further attached to the images which have undergone image processing.

23. A method for deriving the differences between two images as defined in claim 22, wherein:
the image processing include a gradation process.

24. A method for deriving the differences between two images as defined in claim 22, wherein:
the image processing include a frequency process.

25. A method for deriving the differences between two images as defined in claim 22, wherein the performing inter image calculation comprises:

aligning the positions of the two images so that structural components of the single subject substantially match; wherein the inter image calculation is performed between the two images which have been positionally aligned.

* * * * *